(12) United States Patent
Scott et al.

(10) Patent No.: US 6,928,195 B2
(45) Date of Patent: Aug. 9, 2005

(54) PALM SCANNER USING A PROGRAMMABLE NUTATING MIRROR FOR INCREASED RESOLUTION

(75) Inventors: Walter G. Scott, North Palm Beach, FL (US); John Van Dusen, Jupiter, FL (US); Richard D. Irving, Palm Beach Gardens, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 636 days.

(21) Appl. No.: 10/020,498

(22) Filed: Dec. 18, 2001

(65) Prior Publication Data
US 2002/0090147 A1 Jul. 11, 2002

Related U.S. Application Data
(60) Provisional application No. 60/255,890, filed on Dec. 18, 2000.

(51) Int. Cl.[7] ............................ G06K 9/32; G02B 26/08
(52) U.S. Cl. ........................................ 382/299; 359/226
(58) Field of Search ................................. 382/124, 127, 382/274, 296, 299, 313; 396/261, 315; 359/17, 19, 226, 212; 358/1.2

(56) References Cited

U.S. PATENT DOCUMENTS

| | | | |
|---|---|---|---|
| 2,500,017 A | 3/1950 | Altman |
| 3,200,701 A | 8/1965 | White |
| 3,475,588 A | 10/1969 | McMaster |
| 3,482,498 A | 12/1969 | Becker |
| 3,495,259 A | 2/1970 | Rocholl et al. |
| 3,527,535 A | 9/1970 | Monroe |
| 3,540,025 A | 11/1970 | Levin et al. |
| 3,617,120 A | 11/1971 | Roka et al. |

(Continued)

FOREIGN PATENT DOCUMENTS

| EP | 0 101 772 A1 | 3/1984 |
|---|---|---|
| EP | 0 308 162 A2 | 3/1989 |
| EP | 0 308 162 A3 | 3/1989 |
| EP | 0 379 333 A1 | 7/1990 |
| EP | 0 623 890 A2 | 11/1994 |
| EP | 0 623 890 A3 | 11/1994 |
| EP | 0 653 882 A1 | 5/1995 |
| EP | 0 379 333 B1 | 7/1995 |

(Continued)

OTHER PUBLICATIONS

Roethenbaugh, G., *Biometrics Explained*, International Computer Security Association, ICSA, Inc., pp. 1–34.

IBM Technical Disclosure Bulletin, IBM Corp., Oct. 1986, vol. 29, No. 5, pp. 1–3.

LS 1 LiveScan Booking Workstation High Performance Finger & Palm Scanning System, Heimann Rheinmentall Elektronik [online], retrieved Jun. 4, 1998. Retrieved from the Internet: <URL: http://www.hbs–jena.com/lsl.htm, 6 pages.

(Continued)

*Primary Examiner*—Kanjishai Patel
(74) *Attorney, Agent, or Firm*—Sterne, Kessler, Goldstein & Fox P.L.L.C.

(57) ABSTRACT

A system and method for increasing image resolution in a palm print scanner. The method of the invention requires the synchronization of a nutating mirror with a camera frame sync. A first image is scanned at a first nutation position. The mirror is nutated by a fraction of a pixel amount in one direction. Another image is scanned at a second nutation position. The process of nutating the mirror to a different nutation position and scanning an image is repeated until all sub-pixels needed to increase an image resolution are obtained. All of the sub-pixels obtained are then interlaced to obtain a higher resolution image.

8 Claims, 5 Drawing Sheets

U.S. PATENT DOCUMENTS

| | | | |
|---|---|---|---|
| 3,699,519 A | 10/1972 | Campbell | |
| 3,704,949 A | * 12/1972 | Thomas et al. | 356/71 |
| 3,906,520 A | 9/1975 | Phillips | |
| 3,947,128 A | 3/1976 | Weinberger et al. | |
| 3,968,476 A | 7/1976 | McMahon | |
| 3,975,711 A | 8/1976 | McMahon | |
| 4,032,975 A | 6/1977 | Malueg et al. | |
| 4,063,226 A | 12/1977 | Kozma et al. | |
| 4,066,341 A | * 1/1978 | Schubert | 359/876 |
| 4,120,585 A | 10/1978 | DePalma et al. | |
| 4,152,056 A | 5/1979 | Fowler | |
| 4,209,481 A | 6/1980 | Kashiro et al. | |
| 4,210,899 A | 7/1980 | Swonger et al. | |
| 4,253,086 A | 2/1981 | Szwarcbier | |
| 4,322,163 A | 3/1982 | Schiller | |
| 4,414,684 A | 11/1983 | Blonder | |
| 4,537,484 A | 8/1985 | Fowler et al. | |
| 4,544,267 A | 10/1985 | Schiller | |
| 4,553,837 A | 11/1985 | Marcus | |
| 4,601,195 A | 7/1986 | Garritano | |
| 4,633,317 A | * 12/1986 | Uwira et al. | 348/219.1 |
| 4,669,487 A | 6/1987 | Frieling | |
| 4,681,435 A | 7/1987 | Kubota et al. | |
| 4,684,802 A | 8/1987 | Hakenewerth et al. | |
| 4,701,772 A | 10/1987 | Anderson et al. | |
| 4,783,823 A | 11/1988 | Tasaki et al. | |
| 4,784,484 A | 11/1988 | Jensen | |
| 4,787,742 A | * 11/1988 | Schiller et al. | 356/71 |
| 4,792,226 A | 12/1988 | Fishbine et al. | |
| 4,811,414 A | 3/1989 | Fishbine et al. | |
| 4,876,726 A | 10/1989 | Capello et al. | |
| 4,905,293 A | 2/1990 | Asai et al. | |
| 4,924,085 A | 5/1990 | Kato et al. | |
| 4,933,976 A | 6/1990 | Fishbine et al. | |
| 4,942,482 A | 7/1990 | Kakinuma et al. | |
| 4,946,276 A | 8/1990 | Chilcott | |
| 4,995,086 A | 2/1991 | Lilley et al. | |
| 5,054,090 A | 10/1991 | Knight et al. | |
| 5,067,162 A | 11/1991 | Driscoll, Jr. et al. | |
| 5,067,749 A | 11/1991 | Land | |
| 5,131,038 A | 7/1992 | Puhl et al. | |
| 5,146,102 A | 9/1992 | Higuchi et al. | |
| 5,157,497 A | 10/1992 | Topper et al. | |
| 5,185,673 A | 2/1993 | Sobol | |
| 5,187,747 A | 2/1993 | Capello et al. | |
| 5,210,588 A | 5/1993 | Lee | |
| 5,222,152 A | 6/1993 | Fishbine et al. | |
| 5,222,153 A | 6/1993 | Beiswenger | |
| 5,230,025 A | 7/1993 | Fishbine et al. | |
| 5,233,404 A | 8/1993 | Lougheed et al. | |
| 5,249,370 A | 10/1993 | Stanger et al. | |
| 5,253,085 A | 10/1993 | Maruo et al. | |
| 5,261,266 A | 11/1993 | Lorenz et al. | |
| 5,285,293 A | 2/1994 | Webb et al. | |
| 5,291,318 A | 3/1994 | Genovese | |
| D348,445 S | 7/1994 | Fishbine et al. | |
| 5,351,127 A | 9/1994 | King et al. | |
| D351,144 S | 10/1994 | Fishbine et al. | |
| 5,363,318 A | 11/1994 | McCauley | |
| 5,384,621 A | 1/1995 | Hatch et al. | |
| 5,412,463 A | 5/1995 | Sibbald et al. | |
| 5,416,573 A | 5/1995 | Sartor, Jr. | |
| 5,448,649 A | 9/1995 | Chen et al. | |
| 5,467,403 A | 11/1995 | Fishbine et al. | |
| 5,469,506 A | 11/1995 | Berson et al. | |
| 5,471,240 A | 11/1995 | Prager et al. | |
| 5,473,144 A | 12/1995 | Mathurin, Jr. | |
| 5,483,601 A | 1/1996 | Faulkner | |
| 5,509,083 A | 4/1996 | Abtahi et al. | |
| 5,517,528 A | 5/1996 | Johnson | |
| 5,528,355 A | 6/1996 | Maase et al. | |
| 5,548,394 A | 8/1996 | Giles et al. | |
| 5,591,949 A | 1/1997 | Bernstein | |
| 5,596,454 A | 1/1997 | Hebert | |
| 5,598,474 A | 1/1997 | Johnson | |
| 5,613,014 A | 3/1997 | Eshera et al. | |
| 5,615,277 A | 3/1997 | Hoffman | |
| 5,625,448 A | 4/1997 | Ranalli et al. | |
| 5,640,422 A | 6/1997 | Johnson | |
| 5,649,128 A | 7/1997 | Hartley | |
| 5,650,842 A | 7/1997 | Maase et al. | |
| 5,661,451 A | 8/1997 | Pollag | |
| 5,680,205 A | 10/1997 | Borza | |
| 5,689,529 A | 11/1997 | Johnson | |
| 5,717,777 A | 2/1998 | Wong et al. | |
| 5,729,334 A | 3/1998 | Van Ruyven | |
| 5,736,734 A | 4/1998 | Marcus et al. | |
| 5,745,684 A | 4/1998 | Oskouy et al. | |
| 5,748,766 A | 5/1998 | Maase et al. | |
| 5,748,768 A | 5/1998 | Sivers et al. | |
| 5,755,748 A | 5/1998 | Borza | |
| 5,757,278 A | 5/1998 | Itsumi | |
| 5,767,989 A | 6/1998 | Sakaguchi | |
| 5,778,089 A | 7/1998 | Borza | |
| 5,781,647 A | 7/1998 | Fishbine et al. | |
| 5,793,218 A | 8/1998 | Oster et al. | |
| 5,801,681 A | 9/1998 | Sayag | |
| 5,805,777 A | 9/1998 | Kuchta | |
| 5,809,172 A | 9/1998 | Melen | |
| 5,812,067 A | 9/1998 | Bergholz et al. | |
| 5,815,252 A | 9/1998 | Price-Francis | |
| 5,818,956 A | 10/1998 | Tuli | |
| 5,822,445 A | 10/1998 | Wong | |
| 5,825,005 A | 10/1998 | Behnke | |
| 5,825,474 A | 10/1998 | Maase | |
| 5,828,773 A | 10/1998 | Setlak et al. | |
| 5,832,244 A | 11/1998 | Jolley et al. | |
| 5,848,231 A | 12/1998 | Teitelbaum et al. | |
| 5,855,433 A | 1/1999 | Velho et al. | |
| 5,859,420 A | 1/1999 | Borza | |
| 5,859,710 A | 1/1999 | Hannah | |
| 5,862,247 A | 1/1999 | Fisun et al. | |
| 5,867,802 A | 2/1999 | Borza | |
| 5,869,822 A | 2/1999 | Meadows, II et al. | |
| 5,872,834 A | 2/1999 | Teitelbaum | |
| 5,892,599 A | 4/1999 | Bahuguna | |
| 5,900,993 A | 5/1999 | Betensky | |
| 5,907,627 A | 5/1999 | Borza | |
| 5,920,384 A | 7/1999 | Borza | |
| 5,920,640 A | 7/1999 | Salatino et al. | |
| 5,928,347 A | 7/1999 | Jones | |
| 5,942,761 A | 8/1999 | Tuli | |
| 5,946,135 A | 8/1999 | Auerswald et al. | |
| 5,960,100 A | 9/1999 | Hargrove | |
| 5,973,731 A | 10/1999 | Schwab | |
| 5,974,162 A | 10/1999 | Metz et al. | |
| 5,987,155 A | 11/1999 | Dunn et al. | |
| 5,991,467 A | 11/1999 | Kamiko | |
| 5,995,014 A | 11/1999 | DiMaria | |
| 5,999,307 A | 12/1999 | Whitehead et al. | |
| 6,018,739 A | 1/2000 | McCoy et al. | |
| 6,023,522 A | 2/2000 | Draganoff et al. | |
| 6,038,332 A | 3/2000 | Fishbine et al. | |
| 6,041,372 A | 3/2000 | Hart et al. | |
| 6,055,071 A | 4/2000 | Kuwata et al. | |
| 6,064,398 A | 5/2000 | Ellenby et al. | |
| 6,064,753 A | 5/2000 | Bolle et al. | |
| 6,064,779 A | 5/2000 | Neukermans et al. | |
| 6,072,891 A | 6/2000 | Hamid et al. | |
| 6,075,876 A | 6/2000 | Draganoff | |
| 6,078,265 A | 6/2000 | Bonder et al. | |

| | | | |
|---|---|---|---|
| 6,088,585 A | 7/2000 | Schmitt et al. | |
| 6,097,873 A | 8/2000 | Filas et al. | |
| 6,104,809 A | 8/2000 | Berson et al. | |
| 6,115,484 A | 9/2000 | Bowker et al. | |
| 6,122,394 A * | 9/2000 | Neukermans et al. | 382/124 |
| 6,144,408 A | 11/2000 | MacLean | |
| 6,150,665 A | 11/2000 | Suga | |
| 6,154,285 A | 11/2000 | Teng et al. | |
| 6,162,486 A | 12/2000 | Samouilhan et al. | |
| 6,166,787 A | 12/2000 | Akins et al. | |
| 6,178,255 B1 | 1/2001 | Scott et al. | |
| 6,195,447 B1 | 2/2001 | Ross | |
| 6,198,836 B1 | 3/2001 | Hauke | |
| 6,204,331 B1 | 3/2001 | Sullivan et al. | |
| 6,259,108 B1 | 7/2001 | Antonelli et al. | |
| 6,272,562 B1 | 8/2001 | Scott et al. | |
| 6,281,931 B1 | 8/2001 | Tsao et al. | |
| 6,327,047 B1 | 12/2001 | Motamed | |
| 6,347,163 B2 | 2/2002 | Roustaei | |
| 6,658,164 B1 * | 12/2003 | Irving et al. | 382/274 |
| 2002/0030668 A1 | 3/2002 | Hoshino et al. | |

FOREIGN PATENT DOCUMENTS

| | | | |
|---|---|---|---|
| EP | 0 889 432 A2 | 1/1999 | G06K/9/00 |
| EP | 0 905 646 A1 | 3/1999 | |
| EP | 0 785 750 B1 | 6/1999 | A61B/5/117 |
| EP | 0 924 656 A2 | 6/1999 | |
| EP | 0 653 882 B1 | 1/2000 | H04N/5/217 |
| EP | 0 623 890 B1 | 8/2001 | |
| GB | 2 089 545 | 6/1982 | G06K/9/20 |
| GB | 2 313 441 | 11/1997 | G06K/7/10 |
| JP | 62-212892 | 9/1987 | G06K/9/20 |
| JP | 1-205392 | 8/1989 | G06K/9/00 |
| JP | 3-161884 | 7/1991 | G06K/9/00 |
| JP | 3-194674 | 8/1991 | G06K/9/00 |
| JP | 3-194675 | 8/1991 | G06K/9/00 |
| JP | 11-225272 A | 8/1999 | |
| JP | 11-289421 A | 10/1999 | |
| WO | WO 87/02491 A1 | 4/1987 | |
| WO | WO 90/03620 A1 | 4/1990 | |
| WO | WO 92/11608 A1 | 7/1992 | |
| WO | WO 94/22371 A3 | 10/1994 | |
| WO | WO 94/22371 A2 | 10/1994 | |
| WO | WO 96/17480 | 6/1996 | H04N/13/93 |
| WO | WO 97/29477 A1 | 8/1997 | |
| WO | WO 97/41528 A1 | 11/1997 | |
| WO | WO 98/09246 A1 | 3/1998 | |
| WO | WO 98/12670 A1 | 3/1998 | |
| WO | WO 99/12123 | 3/1999 | G06K/9/00 |
| WO | WO 99/26187 A1 | 5/1999 | |
| WO | WO 99/40535 A1 | 8/1999 | |

OTHER PUBLICATIONS

TouchPrint™ 600 Palm Scanner, Identix [online], retrieved Nov. 17, 1999. Retrieved from the Internet:<URL: http://www.identix.com/products/palmscan.htm, 3 pages.

English–language Abstract of Japanese Patent Publication No. 01–205392, from http://www1.ipdl.jpo.go.jp, 1 page (Aug. 17, 1989—Date of publication of application).

English–language Abstract of Japanese Patent Publication No. 03–161884, from http://www1.ipdl.jpo.go.jp, 2 pages (Jul. 11, 1991—Date of publication of application).

English–language Abstract of Japanese Patent Publication No. 03–194674, from http://www1.ipdl.jpo.go.jp, 2 pages (Aug. 26, 1991—Date of publication of application).

English–language Abstract of Japanese Patent Publication No. 03–194675, from http://www1.ipdl.jpo.go.jp, 2 pages (Aug. 26, 1991—Date of publication of application).

English–language Abstract of Japanese Patent Publication No. 62–212892, from http://www1/ipdl.jpo.go.jp, 1 page (Sep. 18, 1987—Date of publication of application).

English–language Abstract of Japanese Patent Publication No. 10079017, 1 Page (Mar. 24, 1998—Date of publication of application).

Btt (Biometric Technology Today), Finger technologies contacts, 2 pages.

Drake, M.D. et al., "Wavelength hologram fingerprint entry device," *Optical Engineering*, vol. 35, No. 9, Sep. 1996, pp. 2499–2505.

*Automated Identification Systems* (visited May 20, 1999) <http://www.trw.com/idsystems/bldgaccess2.html>, 1 page, Copyright 1999.

*Ultra–Scan Corporation Home Page* (visited May 20, 1999) <http://www.ultra–scan.com/index.htm>, 3 pages. (discusses technology as early as 1996).

*Profile* (last updated Aug. 16, 1998) <http://www.dermalog.de/Britain/Profile/profile.htm>, 3 pages. (discusses technology as early as 1990).

*ID–Card System Technical Specifications* (last updated Jul. 18, 1998) <http://dermalog.de/Britain/Products/ID–Card/idcard2.htm>, 2 pages.

*Fujitsu Limited Products and Services* (updated Apr. 21, 1999) <http://www.fujitsu.co.jp/hypertext/Products/index–e,html>, 3 pages, Copyright 1995–1999.

*SonyDCam* (visited May 20, 1999) <http://www.microsoft.com/DDK/ddkdocs/Win2k/sonydcam.htm>, 3 pages, Copyright 1999.

*Verid Fingerprint Verification* (visited May 17, 1999) <http://www.tssi.co.uk/products/finger.html>, 2 pages.

*Startek's Fingerprint Verification Products: Fingerguard FG–40* (visited May 18, 1999) <http://www.startek.com.tw/product/fg40/fg40html>, 3 pages.

*SAC Technologies Showcases Stand–Alone SAC–Remote(TM)* (visited May 18, 1999) <http://www.pathfinder.com/money/latest/press/PW/1998Mar25/1026.html>, 2 pages.

"Biometrics, The Future is Now," www.securitymagazine.com, May 1999, pp. 25–26.

*Mytec Technologies Gateway*, (visited Apr. 27, 1999) <http://www.mytec.com/Products/gateway/>, 1 page.

*Mytec Technologies Gateway: Features & Benefits*, (visited Apr. 27, 1999) <http://www.mytec.com/Products/gateway/features.htm>, 1 page.

*Mytec Technologies Touchstone Pro*, (visited Apr. 27, 1999) <http://www.mytec.com/Products/Touchstone/>, 1 page.

*Mytec Technologies Touchstone Pro: Features*, (visited Apr. 27, 1999) <http://www.mytec.com/Products/Touchstone/features.htm>, 1 page.

*Electronic Timeclock Systems and Biometric Readers* (last updated Apr. 17, 1999) <http://www.lfs–hr–bene.com/tclocks.html>, 1 page.

*Fingerprint Time Clock* (visited May 17, 1999) <http://www.lfs–hr–bene.com/Biometrics/Fingerprintclock.html>, 6 pages.

*KC–901: The KSI fingerprint sensor* (visited May 17, 1999) <http://www.kinetic.bc.ca/kc–901.html>, 3 pages.

*Intelnet Inc.* (visited May 20, 1999) <http://www.intelgate.com/index.html>, 1 page, Copyright 1996.

*Ver–i–Fus Fingerprint Access Control System* (visited May 20, 1999) <http://www.intelgate.com/verifus.htm>, 2 pages (Ver–i–fus product released in 1995).

*Ver–i–fus® Configurations* (visited May 20, 1999) <http://www.intelgate.com/verconfig.htm>, 1 page. (Ver–i–fus product released in 1995).

*Ver–i–Fus®* & *Ver–i–Fus^mil®* (visited May 20, 1999) <http://www.intelgate.com/vif_data.htm>, 3 pages. (Ver–i–fus product released in 1995).
*Access Control System Configurations* (visited May 20, 1999) <http://www.intelgate.com/access.htm>, 2 pages. (Ver–i–fus product released in 1995).
*Company* (visited May 17, 1999) <http://www.instainfo.com.company.htm>, 2 pages.
*TouchLock™ II Fingerprint Identity Verification Terminal* (visited May 17, 1999) <http://www.identix.com/TLock.htm>, 4 pages.
*Physical Security and Staff Tracking Solutions* (visited May 17, 1999) <http://www.identix.com/products/biosecurity.html>, 3 pages, Copyright 1996–1998.
*Veriprint2000 Fingerprint Verification Terminal For Use With Jantek Time & Attendance Software* (visited May 17, 1999) <http://www.hunterequipment.com/fingerprint.htm>, 2 pages.
*Veriprint Product Applications* (visited Apr. 27, 1999) <http://www.biometricid.com/uses.htm>, 1 page, Copyright 1999.
*BII Home Page* (visited Apr. 27, 1999) <http://www.biometricid.com/homepage.htm>, 1 page, Copyright 1999.
*Veriprint 2100 Stand–Alone Fingerprint Verification Terminal* (visited Apr. 27, 1999) <http://www.biometricid.com/veriprint2100.htm>, 3 pages.
Randall, N., "A Serial Bus on Speed," *PC Magazine*, May 25, 1999, pp. 201–203.
*The DERMALOG Check–ID* (visited Nov. 12, 1999) <http://www.dermalog.de/ganzneu/products_check.html>, 1 page.
*Check–ID Specifications and Features* (visited Nov. 12, 1999) <http://www.dermalog.de/ganzneu/spec_check.html>, 1 page, Copyright 1999.
*Startek's Fingerprint Verification Products: FingerFile 1050* (visited Oct. 8, 1999) <http://www.startek.com.tw/product/ff1050/ff1050.html>, 3 pages.
*Time is Money!* (visited Jun. 5, 1998) <http://www.iaus.com/afim.htm>, 3 pages.
*Welcome to the Homepage of Heimann Biometric Systems GMBH* (visited Jun. 4, 1998) <http://www.hbs–jena.com/>, 1 page, Copyright 1998.
*Heimann Biometric Systems Corporate Overview* (visited Jun. 4, 1998) <http://www.hbs–jena.com/company.htm>, 4 pages, Copyright 1998.
*Remote Access Positive IDentification—raPID* (visited Jun. 3, 1998) <http://www.nec.com/cgi–bin/showproduct.exe?pro...emote+Access+Positive+IDentification+%2D+raPID>, 2 pages, Copyright 1997.
*Morpho DigiScan Cellular* (visited Jun. 3, 1998) <http://www.morpho.com/products/law_enforcement/digiscan/cellular.htm>, 2 pages, Copyright 1998.
*A.F.I.S.* (last updated Apr. 2, 1998) <http://www.dermalog.de/afis.htm>, 2 pages.
*Morpho FlexScan Workstation* (visited Jun. 3, 1998) <http://www.morpho.com/products/law_enforcement/flexscan/>, 2 pages, Copyright 1998.
True–ID® The LiveScan with special "ability" . . . , 2 pages.
*Printrak International: User List* (visited Jun. 3, 1998) <http://www.printrakinternational.com and links>, 10 pages, Copyright 1996.
*Live–Scan Products: Tenprinter® 1133S* (visited Apr. 23, 1999) <http://www.digitalbiometrics.com/Products/tenprinter.htm>, 4 pages. (Tenprinter 1133S released in 1996).
*TouchPrint™ 600 Live–Scan System* (visited Nov. 17, 1999) <http://www.identix.com/products/livescan.htm>, 4 pages, Copyright 1996–1998.

Systems for Live–Scan Fingerprinting, Digital Biometrics, Inc., 8 pages, Copyright 1998.
DBI FingerPrinte CMS, Digital Biometrics, Inc., 5 pages. (CMS released in 1998).
Fingerscan V20, Identix Incorporated, 1 page, Copyright 1999.
Verid Fingerprint Reader, TSSI, 4 pages.
Response to Request for Information, Cross Match Technologies, Inc., 13 pages, Apr. 14, 1999.
*Startek's Fingerprint Verification Products* (visited Nov. 17, 1999) <http://www.startek.com.tw/product/index.html>, 1 page.
*Introduction to Startek's Fingerprint Verification Products* (visited Nov. 17, 1999) <http://www.startek.com.tw/product/index2.html>, 2 pages.
*Automatic Fingerprint Identification Systems* (visited Nov. 17, 1999) <http://www.sagem.com/en/produit4–en/empreinte–dig–en.htm>, 1 page.
*Digital Biometrics Corporate Information* (visited Nov. 17, 1999) <http://www.digitalbiometrics.com/Corporate_info/Corporate_info.htm>, 2 pages. (discusses technology as early as 1985).
*DBI Live–Scan Products: Digital Biometrics TENPRINTER* (visited Nov. 17, 1999) <http://www.digitalbiometrics.com/products/tenprinter.htm>, 4 pages. (Tenprinter released in 1996).
*DBI Live–Scan Products: Networking Options* (visited Nov. 17, 1999) <http://www.digitalbiometrics.com/products/networking_options.htm>, 3 pages.
*DBI Live–Scan Products: Digital Biometrics FingerPrinter CMS* (visited Nov. 17, 1999) <http://www.digitalbiometrics.com/products/FingerPrinterCMS.htm>, 3 pages. (CMS released in 1998).
*DBI Live–Scan Products: Image Printer Stations* (visited Nov. 17, 1999) <http://www.digitalbiometrics.com/products/image printer.htm>, 2 pages.
*DBI Live–Scan Products: FC–21 Fingerprint Capture Station* (visited Nov. 17, 1999) <http://www.digitalbiometrics.com/products/Fingerprintcapture.htm>, 2 pages.
*Series 400 OEM Scanner* (visited Nov. 17, 1999) <http://www.ultra–scan.com/400.htm>, 3 pages. (Scanner released in 1996).
*USC Scanner Design* (visited Nov. 17, 1999) <http://www.ultra–scan.com/scanner.htm>, 4 pages. (Scanner released in 1996).
*Series 500/600 Scanners* (visited Nov. 17, 1999) <http://www.ultra–scan.com/500.htm>, 3 pages. (Scanner released in 1996).
*Series 700 ID Station* (visited Nov. 17, 1999) <http://www.ultra–scan.com/700.htm>, 3 pages. (Scanner released in 1998).
*Identix: The Corporation* (visited Nov. 17, 1999) <http://www.idnetix.com/corporate/home.htm>, 2 pages, Copyright 1996–1998.
*Biometric Imaging Products* (visited Nov. 17, 1999) <http://www.identix.com/products/bioimage.htm>, 1 page, Copyright 1996–1998.
*TouchPrint™ 600 Live–Scan System* (visited Apr. 23, 1999) <http://www.identix.com/products/livescan.htm>, 4 pages, Copyright 1996–1998.
*TouchPrint™ 600 Card Scan System* (visited Nov. 17, 1999) <http://www.identix.com/products/cardscan.htm>, 3 pages, Copyright 1996–1998.
*Dermalog–Key—The safest and easiest way of access control* (Last updated Jul. 18, 1998) <http://www.dermalog.de/Britain/Products/Key/key.htm>, 1 page.

*Dermalog Finger–ID Your small size solution for high security* (Last updated Jul. 18, 1998) <http://www.dermalog.de/Britain/Products/Finger/fingerid.htm>, 1 page.

*Mytec: Corporate* (visited Nov. 17, 1999) <http://www.mytec.com/corporate/>, 2 pages.

*Kinetic Sciences Inc. Fingerprint Biometrics Division* (visited Nov. 17, 1999) <http://www.kinetic.bc.ca/main–FP-B.html>, 1 page.

*Fingerprint Biometrics: Securing The Next Generation*, May 19, 1999, (visited Nov. 17, 1999) <http://www.secugen.com/pressrel.htm>, 2 pages.

*Secugen Unveils Fully Functional Fingerprint Recognition Solutions*, May 11, 1999, (visited Nov. 17, 1999) <http://www.secugen.com/pressrel.htm>, 3 pages.

*POLLEX Technology Ltd., The Expert in Fingerprint Identification—POLLog* (visited Nov. 17, 1999) <http://www.pollex.ch/english/products/pollog.htm>, 2 pages.

*Sony Fingerprint Identification Terminal* (visited Nov. 17, 1999) <http://www.iosoftware.com/biosols/sony/fiu/applications/fit100.htm>, 2 pages.

*Sony Fingerprint Identification Unit (FIU–700)* (visited Nov. 17, 1999) <http://www.iosoftware.com/biosols/sony/fiu70/index.htm>, 2 pages. (Unit available late 1999).

*Sony Fingerprint Identification Unit* (visited Nov. 17, 1999) <http://www.iosoftware.com/biosols/sony/fiu/index.htm>, 3 pages.

*Fujitsu Fingerprint Recognition Device (FPI–550)* (visited Nov. 17, 1999) <http://www.iosoftware.com/biosols/fujitsu/fpi550.htm>, 2 pages.

*Mitsubishi MyPass LP–1002* (visited Nov. 17, 1999) <http://www.iosoftware.com/biosols/mitsubishi/mypass.htm>, 2 pages.

*SecureTouch PV—A Personal "Password Vault"* (visited Nov. 17, 1999) <http://www.biometricaccess.com/securetouch_pv.htm>, 1 page.

*Digital Descriptor Systems, Inc.–Profile* (visited Nov. 17, 1999) <http://www.ddsi–cpc.com/pages/profile.html>, 3 pages.

*Press Release: Printrak International Announces New Portable Fingerprint ID Solution*, Dec. 10, 1996, (visited Nov. 17, 1999) <http://www.scott.net/~dg/25.htm>, 3 pages.

*Corporate Profile* (visited Nov. 17, 1999) <http://www.printrakinternational.com/corporate.htm>, 1 page.

*Printrak Products* (visited Nov. 17, 1999) <http://www.printrakinternational.com/Products.htm>, 1 page. (Discusses technology as early as 1974).

Verifier™ 200 Fingerprint Capture Devices, Cross Match Technologies, Inc., 2 pages, 1996–1997.

Verifier 200 Direct Fingerprint Reader, Cross Check Corporation, 2 pages, 1996–1997.

Verifier™ 250 Fingerprint Capture Devices, Cross Match Technologies, Inc., 2 pages, 1996–1997.

Verifier 250 Small Footprint Direct Fingerprint Reader, Cross Check Corporation, 2 pages, 1996–1997.

Verifier™ 290 Fingerprint Capture Devices, Cross Match Technologies, Inc., 2 pages, 1996–1997.

Verifier 290 Direct Rolled Fingerprint Reader, Cross Check Corporation, 2 pages, 1996–1997.

Verifier™ 500 Fingerprint Capture Devices, Cross Match Technologies, Inc., 2 pages, 1998.

Biometric terminal, 1 page.

10–Print Imaging System, Cross Check Corporation, 2 pages, 1998.

*Cross Match Technologies, Inc.* (visited Mar. 25, 1999) <http://www.crossmatch.net/>, 1 page.

*Cross Match Technologies, Inc.—Products Overview* (visited Mar. 25, 1999) <http://www.crossmatch.net/new/products/product–index.html>, 1 page.

*Cross Match Technologies, Inc.—Law Enforcement Systems* (visited Mar. 25, 1999) <http://www.crossmatch.net/new/law/law–index.html>, 2 pages.

*Cross Match Technologies, Inc.—Commercial Systems: Building On The Standard* (visited Mar. 25, 1999) <http://www.crossmatch.net/new/commercial/commercial–index.html>, 2 pages.

*Cross Match Technologies, Inc.—International Sales* (visited Mar. 25, 1999) <http://www.crossmatch.net/new/sales/sales–index.html>, 1 page.

*Cross Match Technologies, Inc.—Support* (visited Mar. 25, 1999) <http://www.crossmatch.net/new/support/support–index.html>, 1 page.

*Cross Match Technologies, Inc.—News–Press Releases— Verifier 400 Press Release* (visited Mar. 25, 1999) <http://www.crossmatch.net/new/news/news–pr–050798.html>, 1 page.

*Global Security Fingerscan™ System Overview* (visited Jan. 11, 2000) <http://wwwu–net.com/mbp/sol/g/a9.htm>, 12 pages.

"Command Structure for a Low–Cost (Primitive) Film Scanner," *IBM Technical Disclosure Bulletin*, IBM Corp., vol. 35, No. 7, Dec. 1992, pp. 113–121.

*Fingerprint Scan API Toolkit Version 1.x Feature List* (Apr. 26, 2000) <http://www.mentalix.com/api/archive_fapivi.htm>, 3 pages.

Kunzman, Adam J. and Wetzel, Alan T., "1394 High Performance Serial Bus: The Digital Interface for ATV," *IEEE Transaction on Consumer Electronics*, IEEE, vol. 41, No. 3, Aug. 1995, pp. 893–900.

*Mentalix Provides The First IAFIS–Certified Latent Print Scanning Solution For Windows®* (Jul. 23, 1999) <http://www.mentalix.com/pressreleases/fprintplook3_prel.htm>, 2 pages.

Slujis, F. et al., "An On–chip USB–powered Three–Phase Up/Down DC/DC Converter in a Standard 3.3V CMOS Process," *2000 IEEE International Solid–State Circuits Conference*, IEEE, Feb. 9, 2000, pp. 440–441.

Venot, A. et al., "Automated Comparison of Scintigraphic Images," *Journal of Nuclear Medicine*, vol. 27, No. 8, Aug. 1986, pp. 1337–1342.

English–language Abstract for Japanese Patent Publication No. 59–103474, published Jun. 14, 1984, printed from espacenet.com, 1 page.

English–language Abstract for Japanese Patent Publication No. 10–262071, published Sep. 29, 1998, printed from espacenet.com, 1 page.

English–language Abstract for Japanese Patent Publication No. 11–167630, published Jun. 22, 1999, printed from espacenet.com, 1 page.

English–language Abstract for Japanese Patent Publication No. 11–225272, published Aug. 17, 1999, printed from espacenet.com, 1 page.

English–language Abstract for Japanese Patent Publication No. 11–252489, published Sep. 17, 1999, printed from espacenet.com, 1 page.

English–language Abstract for Japanese Patent Publication No. 11–289421, published Oct. 19, 1999, printed from espacenet.com, 1 page.

* cited by examiner

PALM SCANNER USING A PROGRAMMABLE NUTATING MIRROR FOR INCREASED RESOLUTION

This application claims the benefit under 35 U.S.C. §119(e) of U.S. Provisional Application No. 60/255,890, filed Dec. 18, 2000, which is incorporated by reference herein in its entirety.

BACKGROUND OF THE INVENTION

1. Field of the Invention

The present invention is generally directed to palm print imaging systems.

2. Related Art

Biometrics is a science involving the analysis of biological characteristics. Biometric imaging captures a measurable characteristic of a human being for identity purposes. See, e.g., Gary Roethenbaugh, *Biometrics Explained*, International Computer Security Association, Inc., pp. 1–34, (1998), which is incorporated herein by reference in its entirety.

One type of biometric imaging system is an Automatic Fingerprint Identification System (AFIS). Automatic Fingerprint Identification Systems are used for law enforcement purposes. Law enforcement personnel collect fingerprint images from criminal suspects when they are arrested. Law enforcement personnel also collect fingerprint images from crime scenes. These are known as latent prints.

Palm images may also be present at crime scenes. Many AFIS systems are capable of using palm print images for forensic matching. However, due to the curvature of the palm and insufficient contact between the palm and a flat platen, conventional palm imaging systems usually provide a scanned image of the palm that includes blank pockets representative of the curvature of the palm. Another problem with existing palm scanners is the inability to provide palm images at 500 dots per inch (dpi) resolution using a single camera.

What is needed is a palm imaging system that provides palm images at 500 dpi resolution using a single camera. What is also needed is a palm imaging system that eliminates pockets in the scanned image.

SUMMARY OF THE INVENTION

The present invention solves the above mentioned needs by providing a palm scanner that captures palm images at a high resolution (at least 500 dpi or greater) using a single camera. The present invention accomplishes this by including a two dimensional programmable nutating mirror that increases the resolution provided by a single camera.

Briefly stated, the present invention is directed to a system and method for increasing image resolution in a palm print scanner. According to the method of the invention, the synchronization of a nutating mirror with a camera frame sync is required. A first image is scanned at a first nutation position. The mirror is nutated by a fraction of a pixel amount in one direction. Another image is scanned at a second nutation position. For a third nutation position, the mirror is nutated by a fraction of a pixel in a direction perpendicular to the first movement. The fourth nutation position is accomplished by reversing the first movement, thereby completing a square. The process of nutating the mirror to a different nutation position and scanning an image is repeated until all sub-pixels needed to increase an image resolution are obtained. All of the sub-pixels obtained are then interlaced to obtain a higher resolution image.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

Figure 1:
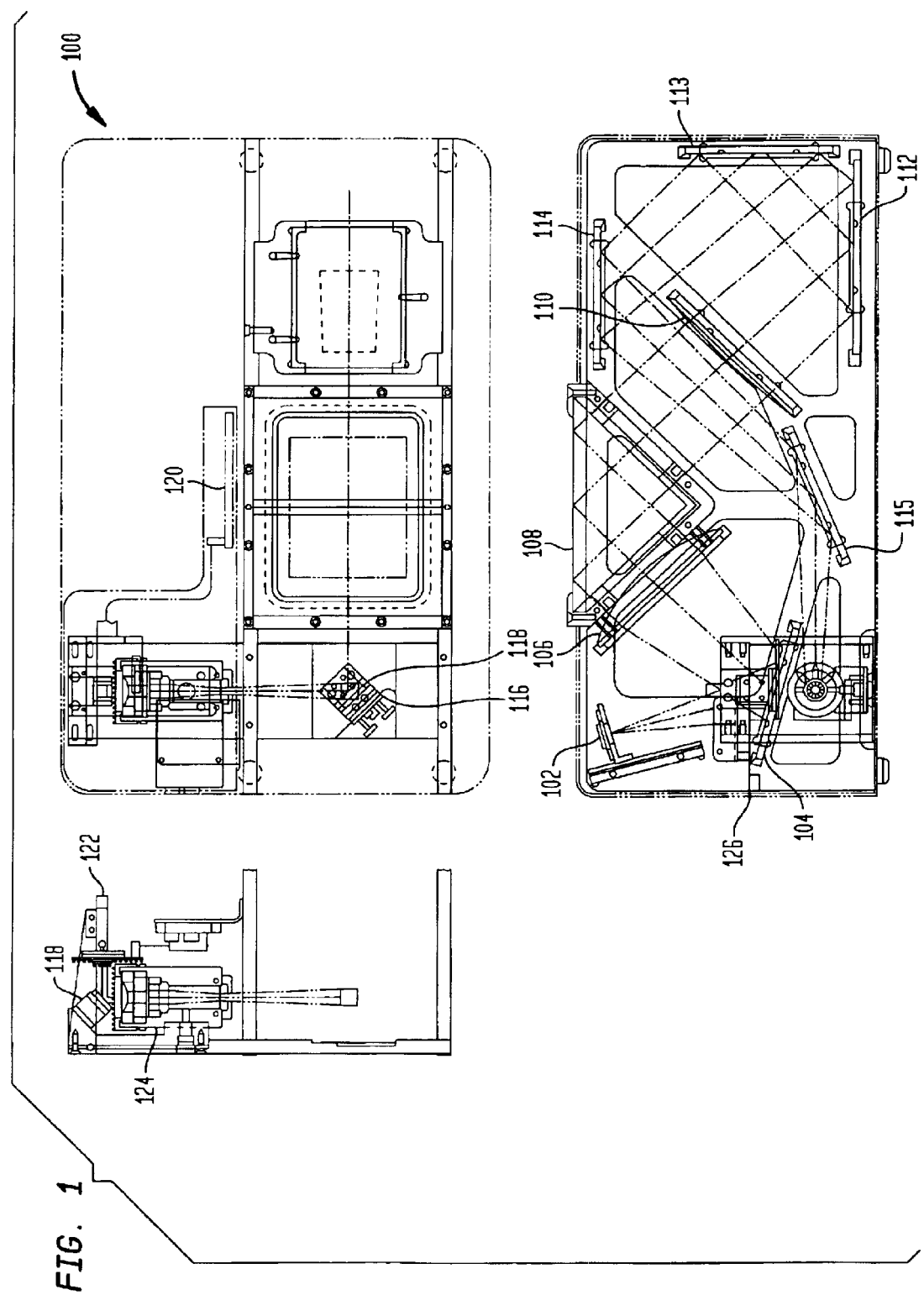
FIG. 1 is a diagram illustrating a palm scanner according to an embodiment of the invention.

The features, objects, and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION OF THE PREFERRED EMBODIMENTS

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

Overview

The present invention is a palm print scanner and method for increasing image resolution using a single camera. The camera (capable of providing images at 250 dpi) and a nutating mirror enable the present invention to provide a method of increasing image resolution to 500 dpi or more. The present invention also supports palm and writer's palm (hypothenar) print images.

FIG. 1 is a block diagram of a palm print scanner 100 according to an embodiment of the present invention. Palm print scanner 100 comprises, inter alia, an LED illuminator 102, an illuminator mirror 104, a condenser lens 106, a spring loaded prism 108, an objective lens 110, a plurality of mirrors 112, 113, 114, and 115, a two-axis tilt mirror mount 116, a nutating mirror 118, a piezo driver board 120, a camera 122, an imaging lens 124, and an interface connector 126. Nutating mirror 118 is a two-axis nutating mirror. The two-axis tilt mirror mount 116 is used to mount nutating mirror 118. Interface connector 126 enables palm scanner 100 to be interfaced to a computer for processing and displaying a palm print image. In one embodiment, the interface is an IEEE 1394 interface (also called "FIREWIRE"), which is well known to those skilled in the relevant art(s).

In one embodiment, LED illuminator 102 is a single visible wavelength LED (such as, a blue LED). The requirement of only one LED is a further advantage of the invention. Of course, additional light sources can be added as desired. Light is emitted from LED illuminator 102, reflected off of illuminator mirror 104 through condenser lens 106 to illuminate prism 108. This process is referred to as color illumination and is well known to those skilled in the relevant art(s). When a palm is placed on prism 108, an internally reflected image from the palm is passed through objective lens 110 and bounces off of the plurality of mirrors 112–115 to nutating mirror 118. Nutating mirror 118 is driven by piezo driver board 120. Piezo driver board 120 comprises piezo actuators that enable the positioning of nutating mirror 118. Nutating mirror 118 reflects the image upwards through imaging lens 124 to an image sensor, such as camera 122 to provide an image of the palm. Imaging lens 124 is used to focus the image on the image sensor. Prism foreshortening is corrected via software. Camera 122 provides an image having a 250 dots per inch (dpi) resolution or less. For example, camera 122 may be an inexpensive CMOS camera with a resolution less than 500 dpi. By tilting nutating mirror 118 a half of a pixel in four different directions and taking an image at each of the four different directions, the present invention is able to fill in pixels to create one image having a high resolution. This high resolution can equal or exceed 500 dpi.

A Conformable Prism

When a palm is placed on a flat platen, insufficient contact is made between the palm and the platen. The resulting image may contain blank pockets. To eliminate images with blank pockets, a conformable prism is used. In one embodiment, an optical gel with a bladder is used. The optical gel and bladder are used to optically couple the palm to the platen. The optical gel and bladder conform to the hand when placed on the hand. The gel and bladder act as a conduit that carries light.

In another embodiment of the invention, the prism hypotenuse is curved to conform to the shape of the palm. In one embodiment, the prism hypotenuse is spherically shaped. In another embodiment, the prism hypotenuse is cylindrically shaped.

In yet another embodiment of the invention, a silicone pad is used to eliminate images with blank pockets.

A Method for Increasing Image Resolution

Figure 2:
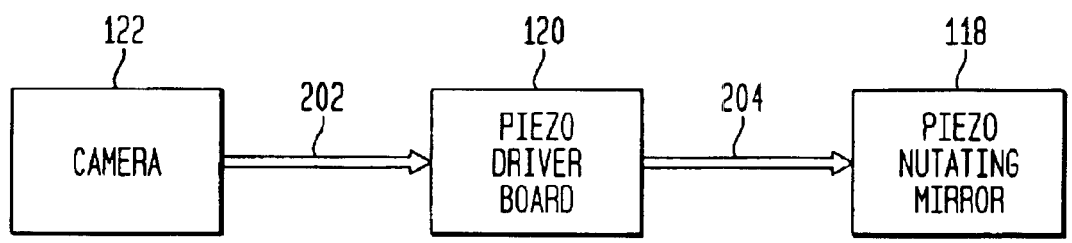
FIG. 2 is a simplified block diagram illustrating the synchronization of a camera with a driver to control a nutating mirror according to an embodiment of the invention.

The present invention customizes camera 122 in order to synchronize the controls for nutating mirror 118 with camera 122. FIG. 2 is a simplified block diagram illustrating the synchronization of camera 122 with driver 120 to control piezo actuators for positioning nutating mirror 118. Camera 122 generates signals 202 that control piezo driver 120. Signals 202 include an I²C signal to set up the voltage needed to drive the actuators for positioning nutating mirror 118 and a phasing signal to indicate when to change the position of nutating mirror 118. Thus, the camera synchronizes the movement of the nutating mirror with the camera's frame operations. Signals 202 also include controls to ensure that nutating mirror 118 has settled to a steady state. Signals 204 are the corresponding voltage and timing signals from piezo driver 120 to nutate mirror 118.

Figure 3:
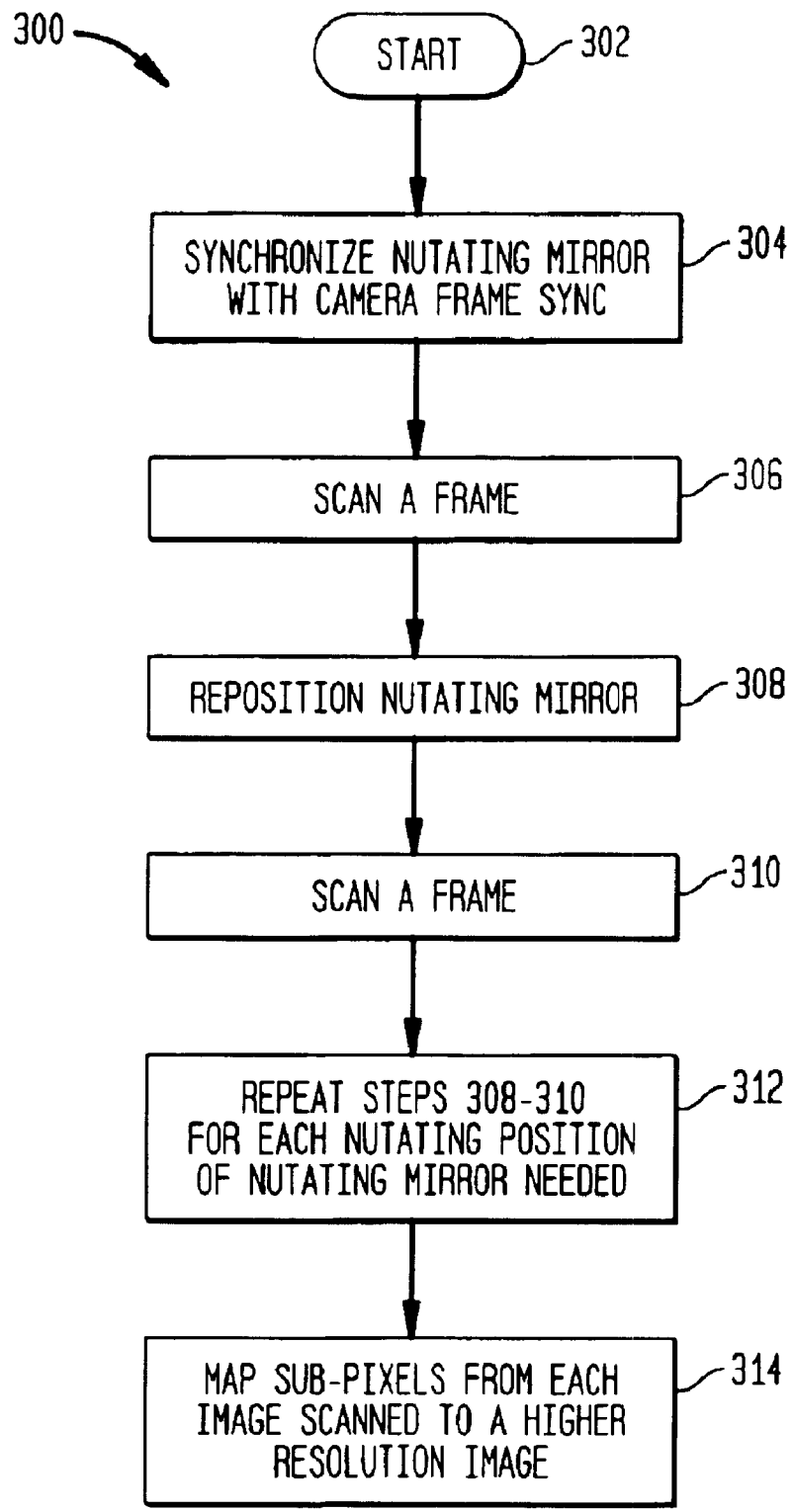
FIG. 3 represents a flow diagram illustrating a method for using a nutating mirror to provide increased resolution in a palm print scanner according to an embodiment of the invention.

FIG. 3 is a flow diagram illustrating a method for using nutating mirror 118 to provide increased resolution in palm print scanner 100. The process begins with step 302, where the process immediately proceeds to step 304.

In step 304, nutating mirror 118 is synchronized with a frame sync of camera 122. The process then proceeds to step 306.

In step 306, camera 122 scans a frame. The image from scanning the frame has a resolution of less than 500 dpi. For example, in one embodiment, camera 122 has a resolution of 250 dpi. The process then proceeds to step 308.

In step 308, driver 120 drives the piezo actuators to position nutating mirror 118. Nutating mirror 118 is programmable to obtain a finer resolution and is two dimensional. In one embodiment, nutating mirror 118 is nutated or tilted a half of a pixel. Mirror 118 is nutated a half of a pixel to enable the increased resolution of 500 dpi or greater, even when an inexpensive lower resolution camera is used. Based on the teachings provided herein, one skilled in the relevant art(s) would know that nutating mirror 118 may be programmed to nutate in any combination desired, such as 2×2, 2×3, 3×3, 4×4, etc., to obtain a particular resolution. The process then proceeds to step 310.

In step 310, camera 122 scans a frame to obtain sub-pixel positions. Prior to scanning the frame, the frame is tagged as a valid frame. Note that nutating mirror 118 is settled to a steady state before the frame is scanned. The process then proceeds to step 312.

In step 312, the process of nutating mirror 118 and scanning the frame to obtain sub-pixel positions from steps 308 to 310 is repeated until all desired sub-pixels are obtained. The process then proceeds to step 314.

Figure 4:
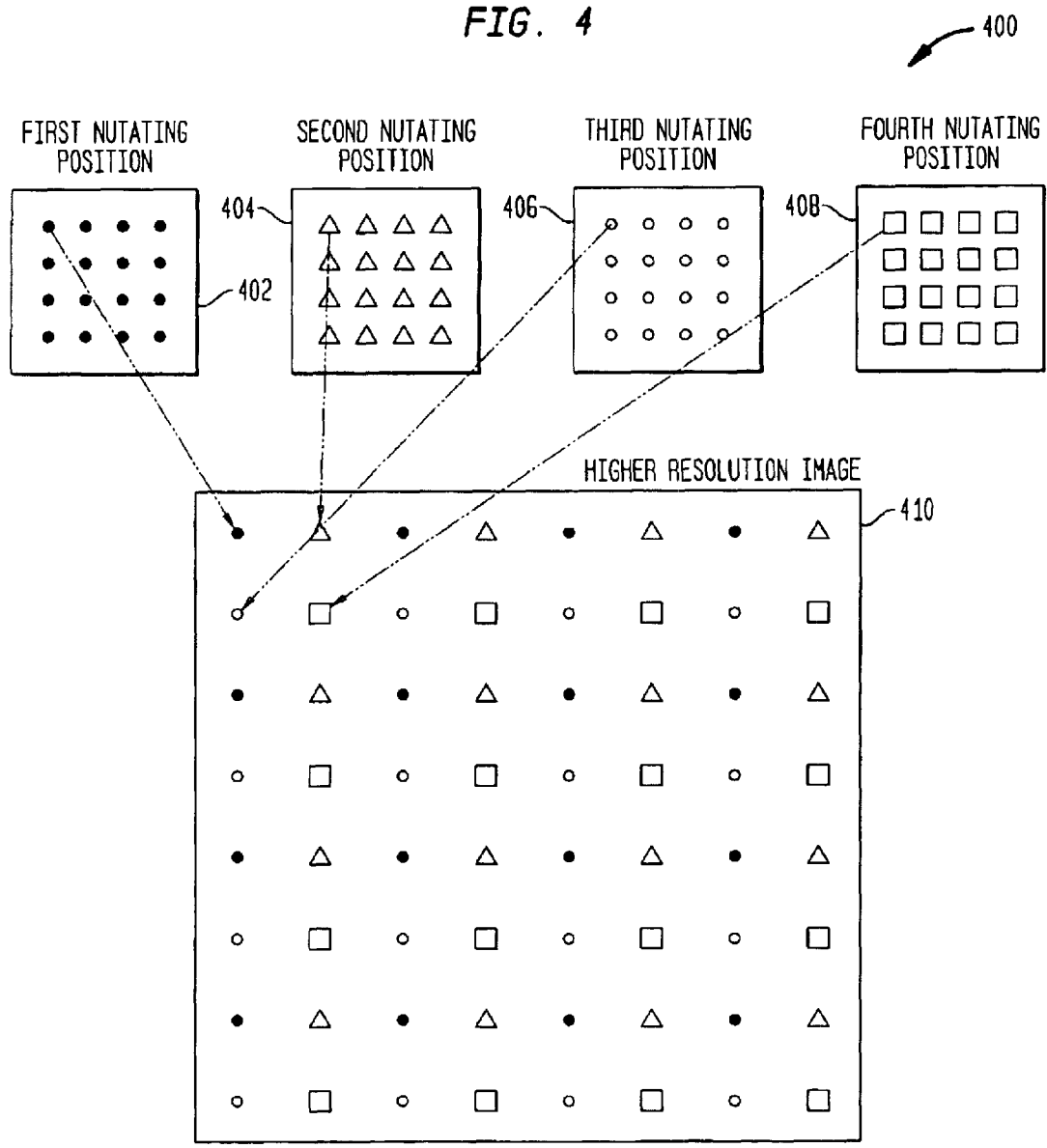
FIG. 4 is a diagram illustrating mapping pixels from four quadrant images into a single image to obtain 500 dots per inch resolution according to an embodiment of the invention.

In step 314, the sub-pixels obtained in steps 306, 310, and 312 are mapped to another image to obtain a higher image resolution. In one embodiment, the sub-pixels are mapped to obtain an image of pixels having a resolution of 500 dpi. FIG. 4 is a diagram illustrating an exemplary process of mapping sub-pixels from the images obtained in steps 306, 310, and 312 into pixels in a higher resolution image. Note that this process of resolution enhancement is only limited by the positional resolution of the nutating mirror and the image resolution of the sensor. In this example, the images are referred to as images taken at one of four different nutation positions. Although this example uses four nutation positions, one skilled in the relevant art(s) would know that more or less nutation positions may be used to obtain a higher resolution image without departing from the scope of the present invention. Sub-pixels from a first nutation position 402 are represented as dots. Sub-pixels from a second nutation position 404 are represented as triangles. Sub-pixels from a third nutation position 406 are represented as circles. Sub-pixels from a fourth nutation position are represented as squares. A higher resolution image 410 is also shown. Higher resolution image 410 shows interlaced sub-pixels from the images taken at four different nutation positions 404–408.

Figure 5:
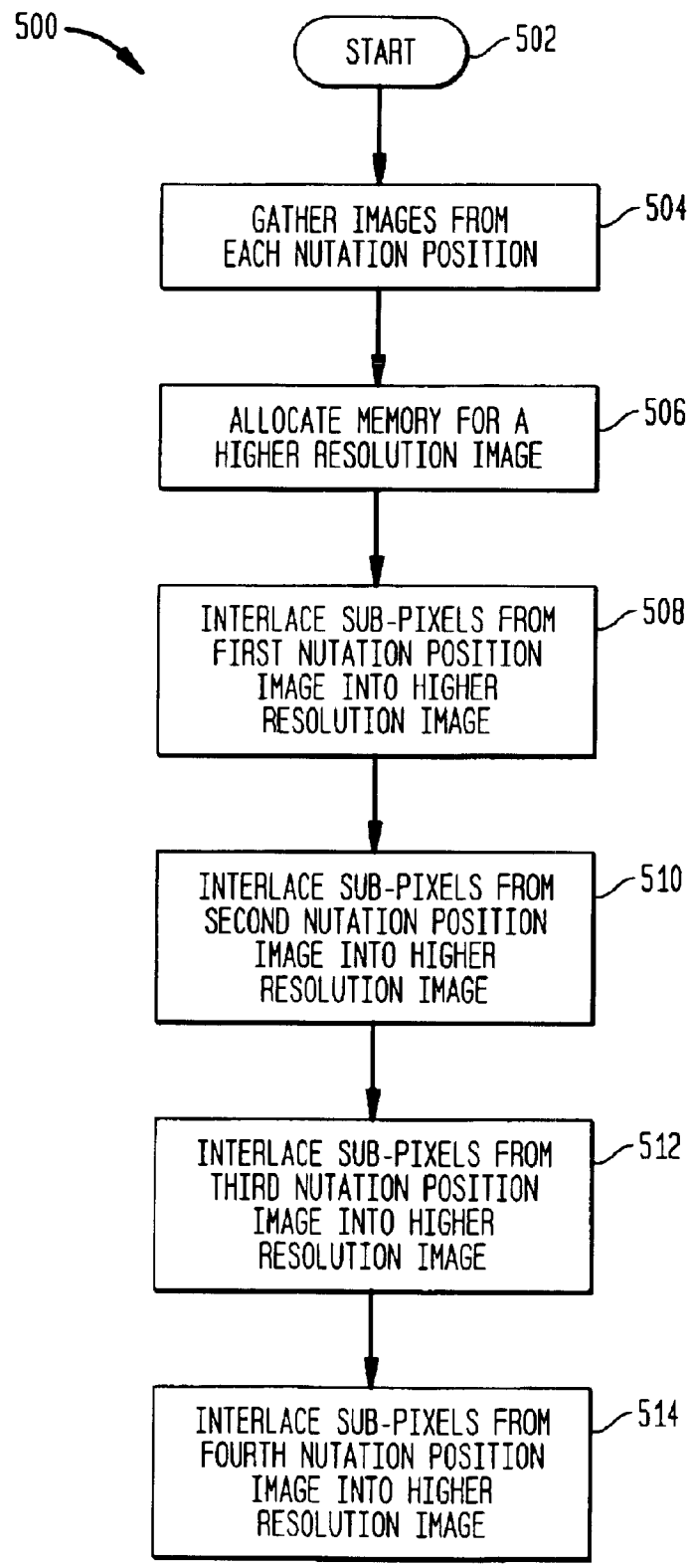
FIG. 5 represents a flow diagram illustrating a two-dimensional interlacing recombining scheme according to an embodiment of the present invention.

FIG. 5 is a flow diagram illustrating a two-dimensional interlacing recombining scheme according to an embodiment of the present invention. The process begins with step 502, where the process immediately proceeds to step 504.

In step 504, the four images from four respective nutation positions 402–408 are selected. The process then proceeds to step 506.

In step 506, space in memory is allocated for higher resolution image 410. The process then proceeds to step 508.

In step 508, the sub-pixels from the image of the first nutation position 402 are placed in higher resolution image 410 pixel by pixel. The process then proceeds to step 510.

In step 510, the sub-pixels from the image of the second nutation position 404 are placed in higher resolution image 410 pixel by pixel. The sub-pixels from the image of the second nutation position 404 are interlaced with the sub-pixels from the image of the first nutation position 402, which were placed in the higher resolution image 410 in step 508. The process then proceeds to step 512.

In step 512, the sub-pixels from the image of the third nutation position 406 are placed in higher resolution image 410 pixel by pixel. The sub-pixels from the image of the third nutation position 406 are interlaced with sub-pixels from images 402 and 404, which were placed in higher resolution image 410 in steps 508 and 510, respectively. The process then proceeds to step 514.

In step 514, the sub-pixels from the image of the fourth nutation position 408 are placed in higher resolution image 410 pixel by pixel. The sub-pixels from the image of the fourth nutation position 408 are interlaced with sub-pixels from images 402, 404, and 406, which were placed in higher resolution image 410 in steps 508, 510, and 512, respectively.

Conclusion

The present invention is not limited to the embodiment of a palm print scanner. The present invention can be used with any system that utilizes a camera and a nutating mirror to generate an image of higher resolution than what would be obtainable from the sole use of the camera. The previous description of the preferred embodiments is provided to enable any person skilled in the art to make or use the present invention. While the invention has been particularly shown and described with reference to preferred embodiments thereof, it will be understood by those skilled in the art that various changes in form and detail may be made therein without departing from the spirit and scope of the invention.

What is claimed is:

1. A method for increasing image resolution in a palm print scanner, comprising the steps of:
   (1) synchronizing a nutating mirror with a camera frame sync;
   (2) scanning a frame of an image at a first nutation position;
   (3) positioning the nutating mirror by a fraction of a pixel amount in one direction to obtain a next nutation position;
   (4) scanning the frame of another image at the next nutation position;
   (5) repeating steps (3) and (4) until an image is obtained for each nutation position needed; and
   (6) mapping sub-pixels from each of the images obtained in steps (2), (4), and (5) to an image of pixels having a higher resolution than the respective images of sub-pixels.

2. The method of claim 1, wherein step (6) comprises the steps of:
   (a) gathering each image of sub-pixels from memory;
   (b) allocating memory for the higher resolution image;
   (c) mapping sub-pixels from the first nutation position image onto the higher resolution image; and
   (d) interlacing sub-pixels from each of the images obtained in steps (2), (4) and (5) onto the higher resolution image.

3. A palm print imaging system, comprising:
   a light emitting diode (LED);
   an illuminator mirror;
   a condenser lens;
   a conformable prism, wherein said LED, said illuminator mirror, and said condenser lens provide color illumination to said conformable prism to obtain an image reflected from said conformable prism;
   plurality of mirrors;
   a nutating mirror, wherein said plurality of mirrors direct said image to said nutating mirror;
   a driver for controlling said nutating mirror; and
   a camera for capturing said image,
   wherein said camera provides signals to said driver to synchronize said nutating mirror with camera frame syncs.

4. The system of claim 3, wherein said conformable prism is spring loaded.

5. The system of claim 3, wherein said conformable prism is used as a palm platen.

6. The system of claim 3, wherein said nutating mirror is repositioned to obtain a plurality of images, wherein said plurality of images are used in an interlacing recombining scheme to obtain a higher resolution image.

7. The system of claim 3, wherein said nutating mirror is two-dimensional and programmable to allow movement in two different axial directions.

8. The system of claim 3, wherein said conformable prism is comprised of a silicone pad.

* * * * *

UNITED STATES PATENT AND TRADEMARK OFFICE
CERTIFICATE OF CORRECTION

| | |
|---|---|
| PATENT NO. | : 6,928,195 B2 |
| APPLICATION NO. | : 10/020498 |
| DATED | : August 9, 2005 |
| INVENTOR(S) | : Scott et al. |

It is certified that error appears in the above-identified patent and that said Letters Patent is hereby corrected as shown below:

<u>Column 6</u>
Line 24, "plurality of mirrors;" should be replaced with --a plurality of mirrors;--.

Signed and Sealed this

Twenty-eighth Day of August, 2007

JON W. DUDAS
*Director of the United States Patent and Trademark Office*